United States Patent Office 3,520,934
Patented July 21, 1970

3,520,934
HYDROGENATION OF CINNAMALDEHYDE
Morris Dunkel and Daniel J. Eckhardt, Paramus, and Alfred Stern, Englewood, N.J., assignors to Universal Oil Products Company, Des Plaines, Ill., a corporation of Delaware
No Drawing. Filed July 15, 1968, Ser. No. 744,629
Int. Cl. C07c 47/48
U.S. Cl. 260—599        7 Claims

ABSTRACT OF THE DISCLOSURE

Hydrogenation of cinnamaldehyde and derivatives thereof under substantially anhydrous conditions utilizing a palladium-alumina catalyst and a potassium salt of a weak acid.

BACKGROUND OF THE INVENTION

The hydrogenation of cinnamaldehyde (cinnamic aldehyde) and derivatives thereof to selectively reduce the olefinic double bond, without simultaneously hydrogenating the readily reducible aldehyde group, has been the subject of considerable study. The early prior art proposed the hydrogenation in the presence of Raney nickel or palladium on charcoal catalyst but such processes have been accompanied by the production to the corresponding hydrocinnamic alcohol. As an improvement thereover, it has been suggested to effect the hydrogenation in a 2-phase liquid system, the aqueous phase comprising an aqueous alkaline solution. This process reduces the formation of the hydrocinnamic alcohol and increases the yield of the desired dihydrocinnamaldehyde.

DESCRIPTION OF THE INVENTION

The present invention provides an improved process for producing increased yields of the desired dihydrocinnamaldehyde and decreased yields of the corresponding alcohol without the disadvantages inherent in an aqueous system. A major objection to an aqueous system is that the aqueous medium comprises a large proportion, which may range up to 50% or perhaps even more, of the reaction mixture and thus reduces the capacity of the process correspondingly. Furthermore, the aqueous system requires additional plant equipment to separate the aqueous medium from the reaction products and this increases the cost of manufacturing the product.

In one embodiment the present invention relates to a process for the hydrogenation of a cinnamaldehyde to effect increased selective hydrogenation of the olefinic double bond and decreased hydrogenation of the carbonyl, which comprises effecting said hydrogenation under substantially anhydrous conditions with hydrogen in contact with a palladium-alumina catalyst and a potassium salt of a weak acid.

From the above embodiment, it will be seen that the improved process of the present invention requires the use of substantially anhydrous conditions, a particular catalyst (palladium-alumina) and a particular alkali-metal additive (potassium salt of weak acid). As will be shown by the data in the appended examples, all of these requirements are essential and they mutually cooperate to produce the improved results. These improved results are particularly pronounced when using the palladium-alumina catalyst as compared, for example, to the use of palladium-carbon, Raney nickel or platinum containing catalysts. The potassium salt is unique in this system in producing the improved results as compared, for example, to the corresponding sodium salts. This is surprising because the earlier teachings have been to the effect that such alkaline materials are equivalent. The above are utilized under substantially anhydrous conditions and thus a mutual and interrelated system is established.

The present invention is used for the hydrogenation of cinnamaldehyde and derivatives thereof. The derivatives include substitutions in the ring and/or side chain. The aromatic rang may be substituted with alkyl, alkoxy, methylenedioxy, ethylenedioxy, etc. or other groups which are inert to reduction under the conditions employed in the process. The side chain may be substituted with one or more lower alkyl groups. Illustrative compounds which may be selectively hydrogenated in accordance with the process of the present invention include cinnamaldehyde, alpha-methyl-cinnamaldehyde, alpha-ethyl cinnamaldehyde, alpha - propyl - cinnamaldehyde, alpha-butyl-cinnamaldehyde, as well as the alpha, beta-dialkyl derivatives such as alpha, beta-dimethyl, alpha, beta-methylethyl, alpha, beta-methylpropyl, alpha, beta-methylbutyl, alpha, beta-ethylpropyl, alpha, beta-ethylbutyl derivatives, etc., p-methyl-cinnamaldehyde, m-ethyl-cinnamaldehyde, o-methyl-cinnamaldehyde, p - ethyl - cinnamaldehyde, m-ethyl-cinnamaldehyde, o-ethyl-cinnamaldehyde, p-propyl-cinnamaldehyde, m-propyl-cinnamaldehyde, o-propyl-cinnamaldehyde, p-butyl-cinnamaldehyde, m-butyl-cinnamaldehyde, o-butyl - cinnamaldehyde, p-amyl-cinnamaldehyde, m-amyl-cinnamaldehyde, o-amyl-cinnamaldehyde, p-methoxy-cinnamaldehyde, m-methoxy-cinnamaldehyde, o-methoxy-cinnamaldehyde, 3,4-methylenedioxy-cinnamaldehyde, etc. Illustrative examples having substituents on both the aromatic ring and on the side chain include p-methyl-alpha-methyl-cinnamaldehyde, p-ethyl-alpha-methyl-cinnamaldehyde, p - propyl-alpha-methyl-cinnamaldehyde, p-butyl-alpha-methyl-cinnamaldehyde, p-methyl-alpha-ethyl-cinnamaldehyde, p-ethyl-alpha-ethyl-cinnamaldehyde, p-propyl-alpha-ethyl-cinnamaldehyde, p-butyl-alpha-ethyl cinnamaldehyde, p-methyl-alpha-propyl-cinnamaldehyde, p - ethyl - alpha-propyl-cinnamaldehyde, p-propyl-alpha-propyl - cinnamaldehyde, p-butyl-alpha-propyl-cinnamaldehyde, etc.

The present invention is of particular advantage for use in the hydrogenation of p-tert-butyl-alpha-methyl-cinnamaldehyde to produce increased yields of p-tert-butyl-alpha-methyl-dihydro-cinnamaldehyde. This compound possesses desirable olfactory properties and is used in prefumery. Thus it may be incorporated in soaps, cosmetic creams and other products to be perfumed.

As hereinbefore set forth, the hydrogenation is effected in contact with a palladium-alumina catalyst. These catalysts are available commercially or may be prepared in any suitable manner. In general, these catalysts are prepared by the neutralization of an acidic aluminum salt such as aluminum chloride, aluminum sulfate, etc. with ammonium hydroxide or other suitable basic reagent, or by the neutralization of a basic aluminum compound as, for example, sodium aluminate with a suitable acid such as sulfuric acid, hydrochloric acid, etc., followed by washing, drying and calcining. The catalyst may contain from 0.1% to 50% by weight of palladium but generally will contain from about 1% to about 10% by weight of palladium. The catalyst may be in any suitable physical form, which may be of uniform or irregular size and shape, and thus may be in the form of powder, granules, pills, pellets, cylinders, tablets, etc. The particular form of the catalyst will be selected on the basis of whether the process is of batch or continuous type. The amount of catalyst will be sufficient to effect the desired hydrogenation and, in a batch type operation, it will be within the range of from 0.5% to 10% by weight based on the cinnamaldehyde charge.

As hereinbefore set forth, the hydrogenation is effected in the presence of a potassium salt of a weak acid. Particularly preferred potassium salts include potassium acetate and potassium carbonate. Other potassium salts include potassium propionate, potassium butyrate, potassium valerate, etc. As hereinbefore set forth and as will be shown in the appended examples, the potassium salts appear to be unique in their use in the present process. The potassium salt is used in any suitable concentration but preferably a stoichiometric equivalent of the salt, based on the weight of palladium present on the catalyst, is added. The preferred weights required will vary with the particular potassium salt employed as additive and generally will be within the range of 0.5 to 5 equivalents of salt based on the palladium in the catalyst. These proportions appear to further increase the yield of the desired aldehyde and to decrease the formation of undesired alcohol.

The hydrogenation is effected under substantially anhydrous conditions which, as hereinbefore set forth, avoids the inherent objections of an aqueous system. However, when desired, the addition of a small amount of water may be used because this does not appear harmful to the present process but generally should be avoided because it does not appear to offer any advantages and only serves to introduce an additional operating step to remove the water. Similarly, any suitable solvent may be used in the process but here again the solvent is not required and its use entails additional handling procedures.

The hydrogenation is effected at any suitable temperature, which may range from 70° to 250° C. and preferably is within the range of from about 100° to about 150° C. A hydrogen pressure of atmospheric to about 1000 pounds per square inch may be employed and preferably is from about 10 to about 250 p.s.i.g. The time of the reaction will be sufficient to effect the desired hydrogenation and may range from 0.25 to 8 hours or more and generally will be within the range of from about 0.5 to 5 hours.

As hereinbefore set forth, the hydrogenation may be effected in a batch or continuous type of process. In a batch type of process, the cinnamaldehyde, catalyst and potassium salt are charged to a closed reactor, which may be equipped with suitable stirring means or may comprise a rotating or rocking autoclave, and hydrogen is pressured therein. The reaction zone is provided with suitable heating means to maintain the desired temperature. When desired, the catalyst may be pretreated with the potassium salt. In a continuous type of process, the catalyst is disposed as a fixed bed in a reaction zone and the cinnamaldehyde and hydrogen in either concurrent or countercurrent flow, are charged to the reaction zone. When it is to be added separately, the potassium salt may be deposited on the catalyst contained in the reaction zone by suitable methods well known to those skilled in the art. All or a portion of the charge may be heated to the desired temperature or the reaction zone may be provided with suitable heating means. The cinnamaldehyde charge generally will be a solid and, therefore, conveniently is heated above its melting point and charged as a liquid to the reaction zone. Alternatively, the cinnamaldehyde charge may be dissolved in a suitable solvent, generally a hydrocarbon, such as benzene, toluene, ethylbenzene, xylene, etc. and supplied to the reaction zone in this manner. In the batch type operation the reaction products are separated from the catalyst by filtering or otherwise and the catalyst may be reused for further hydrogeneration. In either method, the reaction products are fractionated or otherwise treated to recover the desired hydrogenated cinnamaldehyde.

The following examples are introduced to illustrate further the novelty and utility of the present invention but not with the intention of unduly limiting the same.

EXAMPLE I

As hereinbefore set forth, potassium salts appear to be unique in the process of the present invention. This is demonstrated in a series of runs which were made to hydrogenate p-tert-butyl-alpha-methyl-cinnamaldehyde in a Parr shaker apparatus. The cinnamaldehyde charge from the previous manufacturing step was given a crude distillation and 20.2 grams was then charged along with 1.2 grams of 5% palladium on alumina catalyst and 0.044 to 0.053 gram of the alkaline additive. These runs were made at 100° C. and a hydrogen pressure of 60 p.s.i.g. The runs were continued until hydrogen consumption ceased, the time of these runs ranging from 43 to 47 minutes. After cooling, the hydrogenated material was filtered free of catalyst and the filtrate was then analyzed by GLC (gas-liquid-chromotography). When using potassium acetate as the alkaline additive, the product contained 1.2% by weight of the undesired p-tert-butyl-alpha-methyl-dihydro-cinnamic alcohol. In contrast, in the run using sodium acetate instead of potassium acetate, the product contained 14.1% by weight of the alcohol. In still another run, lithium acetate dihydrate was used as the alkaline additive and this resulted in the product containing 10.2% by weight of the alcohol. This demonstrates the unique property of the potassium salt in reducing alcohol formation as compared to the sodium salt.

EXAMPLE II

Another series of runs was made in the same manner as described in Example I. When using potassium carbonate as the alkaline additive, the product contained 1.0% by weight of the corresponding alcohol. In contrast, when sodium carbonate was used as the alkaline additive, the production of the alcohol was 9.9%. Also of interest is another run in which no alkaline additive was used and, in this run, the alcohol production was 9.6% by weight.

EXAMPLE III

As hereinbefore set forth, the potassium salt to be used in the process of the present invention is a potassium salt of a weak acid. This is demonstrated in another run which was made in the same manner as described in the preceding example but using potassium chloride as the additive. In this run, the alcohol production was 11.5% by weight.

EXAMPLE IV

As hereinbefore set forth, it is preferred that a stoichiometric equivalent of the potassium salt be used based upon the gram-atoms of palladium present in the system. A series of three runs was made in the same manner as described in the previous examples (utilizing 1.2 grams of 5% palladium on alumina catalyst). In all cases, potassium acetate was the alkaline additive and it was used in concentrations of 0.027 gram, 0.053 gram and 0.100 gram respectively. The alcohol production in these runs was 4.3%, 2.5% and 2.7% by weight respectively. It appears that the optimum concentration of potassium additive should be above 0.5 equivalents and below 5 equivalents based upon the palladium present in the system.

EXAMPLE V

Another run was made in substantially the same manner as described in Example II except that larger amounts of materials were used. The cinnamaldehyde charge was the crude material as described in Example II. In this run 101 grams of the crude cinnamaldehyde, 6 grams of 5% palladium-alumina catalyst and 0.265 gram of potassium acetate were charged to the reactor. The temperature was 155° C. and the hydrogen pressure initially was 205 p.s.i.g. which decreased to 105 p.s.i.g. over a period of 3 hours. The product contained only 1.9% by weight of the alcohol.

EXAMPLE VI

In still another run made in substantially the same manner as described in Example V except that the initial pressure was 1000 p.s.i.g. which decreased to 615 p.s.i.g.

over a period of 33 minutes. However, the alcohol production was 6.7% by weight. Accordingly, it is preferred that the hydrogen pressure is not above 1000 p.s.i.g. and still more particularly of from about 10 to about 250 p.s.i.g.

EXAMPLE VII

Cinnamaldehyde is subjected to hydrogenation in substantially the same manner as hereinbefore described. The hydrogenation is effected at a temperature of 90° C. and a hydrogen pressure of 100 p.s.i.g. in contact with a 2% palladium on alumina catalyst and potassium propionate additive. Following completion of the reaction, the catalyst is removed by filtration and the filtrate is recovered as the product of the process.

EXAMPLE VIII

In this example, p-isopropyl-alpha-methyl-cinnamaldehyde is subjected to hydrogenation in a continuous process. The catalyst is 5% palladium on alumina in the form of ⅛ inch pills and is pretreated with one equivalent, based on the palladium, of potassium acetate and then is disposed as a fixed bed in a reaction zone. The cinnamaldehyde is heated to a temperature of 100°C. and charged into the upper portion of the reaction zone. Hydrogen is charged near the lower portion of the reaction zone. The reaction products are withdrawn from the lower portion of the reaction zone, cooled and collected in a receiver. Unused hydrogen is withdrawn from the upper portion of the reaction zone and is recycled within the process.

We claim as our invention:

1. In the hydrogenation of a cinnamaldehyde, the method of effecting increased selective hydrogenation of the olefinic double bond and decreased hydrogenation of the carbonyl, which comprises effecting said hydrogenation under substantially anhydrous conditions with hydrogen at a hydrogen pressure of from about atmospheric to about 1000 p.s.i.g. and a temperature of from about 70 to about 250° C. in contact with a palladium on alumina catalyst and a potassium salt of a weak acid wherein the potassium salt is present in an amount of from 0.5 to 5.0 equivalents of palladium in said catalyst.

2. The method of claim 1 wherein said potassium salt is potassium acetate.

3. The method of claim 1 wherein said potassium salt is potassium carbonate.

4. The method of claim 1 in which said catalyst contains from about 1% to about 10% by weight of palladium.

5. The method of claim 1 wherein said cinnamaldehyde is p-tert-butyl-alpha-methyl-cinnamaldehyde.

6. The method of claim 1 wherein said cinnamaldehyde is p-isopropyl-alpha-methyl-cinnamaldehyde.

7. The method of claim 1 wherein the hydrogen pressure is from about 10 to about 250 p.s.i.g. and the temperature is within the range of about 100° to about 150° C.

References Cited

UNITED STATES PATENTS

| 1,844,013 | 2/1932 | Knorr et al. | 260—599 |
| 2,875,131 | 2/1959 | Carpenter et al. | 260—599 XR |
| 3,280,192 | 10/1966 | Levy et al. | 260—599 |
| 3,372,199 | 3/1968 | Rylander et al. | 260—599 |
| 3,415,884 | 12/1968 | Kuwata et al. | 260—599 |

FOREIGN PATENTS 816,151 7/1959 Great Britain.

BERNARD HELFIN, Primary Examiner

U.S. Cl. X.R.

260—340.5, 340.7, 600, 618; 252—466